T. W. McDILL.

Stalk-Chopper.

No. 48,704

Patented July 11. 1865.

Witnesses.
Wm Trewin
Theo Tusch

Inventor.
Thos. W. McDill
By Munn & Co
Attys

UNITED STATES PATENT OFFICE.

THOMAS W. McDILL, OF PERRY, ILLINOIS.

IMPROVEMENT IN DEVICES FOR CUTTING CORNSTALKS ON THE GROUND.

Specification forming part of Letters Patent No. 48,704, dated July 11, 1865.

*To all whom it may concern:*

Be it known that I, THOMAS W. McDILL, of Perry, in the county of Pike and State of Illinois, have invented a new and Improved Device for Cutting Cornstalks; and I do hereby declare that the following is a full, clear, and exact description thereof, which will enable those skilled in the art to make and use the same, reference being had to the accompanying drawings, forming part of this specification, in which—

Figure 1:
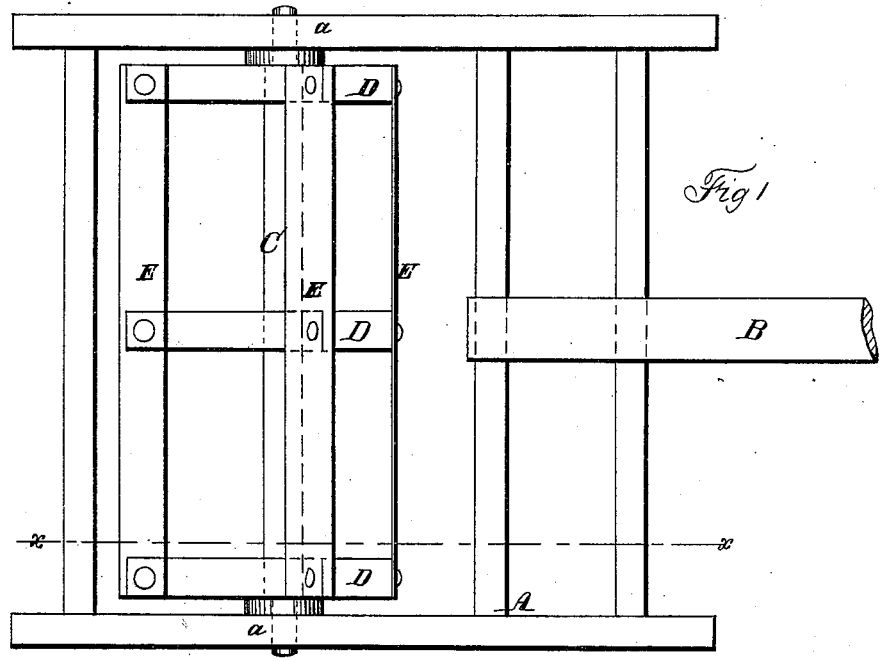
Figure 2:
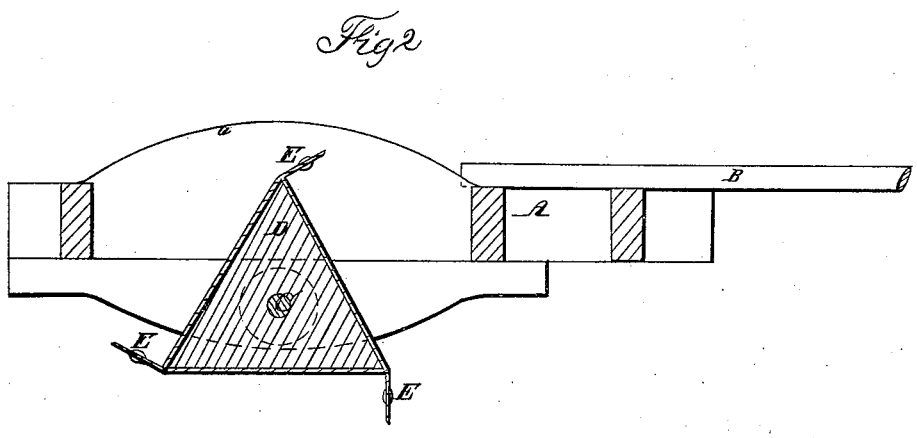

Figure 1 is a plan or top view of my invention; Fig. 2, a side sectional view of the same, taken in the line $x\ x$, Fig. 1.

Similar letters of reference indicate corresponding parts.

This invention relates to a new and improved device for cutting down standing cornstalks in the field and into pieces of such length that they may be plowed under the soil with an ordinary plow.

The invention consists in the employment or use of a suitable frame provided with a draft-pole and a shaft having tri-lateral heads upon it, to which knives are attached at the angles or corners, all being arranged in such a manner as to operate very efficiently for the purpose specified.

A represents a rectangular frame, which has a draft-pole, B, attached to it, and a shaft, C, fitted transversely in it a little at the rear of its center. The shaft C has three tri-lateral heads, D, keyed upon it at equal distances apart. These heads may be of hard wood bound with iron or they may be entirely of cast-iron, and they have knives E secured to them at their angles or corners, the knives being attached to the three heads and extending nearly across the space within the frame A. These knives E project obliquely from the heads D, as shown clearly in Fig. 2, so as to form right angles with the side of the heads directly in front of them, and thereby cause the knives to act upon the corn at a proper angle to insure the same being cut. As the device is drawn along the cutters act successively on the stalks, cutting them into pieces of requisite length for plowing under—from fifteen to eighteen inches—the heads D being of such dimensions as to accomplish that end. The knives are made to cut very efficiently as the machine is drawn along upon them, and as each knife comes in contact with its work the machine is elevated to a certain extent, which causes the succeeding knife to descend upon its work with a certain degree of force sufficient to cut the stalks with certainty.

In drawing the device from place to place the frame A is inverted, so that it will rest upon convex surfaces $a\ a$, the knives in this case being above the surface of the ground.

Having thus described my invention, I claim as new and desire to secure by Letters Patent—

The knives E, attached to triangular heads D, keyed on a shaft, C, which is placed within a suitable frame, A, and all arranged to operate in the manner substantially as and for the purpose set forth.

THOMAS W. McDILL.

Witnesses:
N. D. C. HUME,
H. H. BRENGELMAN.